United States Patent

Schütze et al.

[11] 4,190,337
[45] Feb. 26, 1980

[54] EXPOSURE MEASUREMENT CIRCUIT

[75] Inventors: Siegfried Schütze; Werner Locke, both of Dresden, German Democratic Rep.

[73] Assignee: VEB Pentacon Dresden Kamera- und Kinowerke, Dresden, German Democratic Rep.

[21] Appl. No.: 873,623

[22] Filed: Jan. 30, 1978

[30] Foreign Application Priority Data

Jan. 31, 1977 [DD] German Democratic Rep. .................... 197151[U]

[51] Int. Cl.² .................... G03B 17/18; G01J 1/44
[52] U.S. Cl. .................... 354/60 L; 356/226
[58] Field of Search .................... 354/23 R, 53, 60 R, 354/60 L, 60 E; 340/228 S, 233, 661, 664, 600; 250/210, 214 P; 356/226; 307/103, 297, 257, 321; 323/75 E, 75 F

[56] References Cited

U.S. PATENT DOCUMENTS

| 3,028,538 | 4/1962 | Rosenfeld et al. | 307/297 |
| 3,102,981 | 9/1963 | Pulliam | 323/75 F |
| 3,387,206 | 6/1968 | Sampson | 307/297 |
| 3,452,656 | 7/1969 | Ruhle | 354/60 L X |
| 3,594,088 | 7/1971 | Akiyama | 250/210 |
| 3,596,579 | 8/1971 | Coughlin | 354/60 L |
| 3,753,388 | 8/1973 | Toyoda et al. | 356/226 X |
| 3,955,081 | 5/1976 | Sato et al. | 250/210 |
| 3,979,600 | 9/1976 | Bohning | 323/75 E X |

FOREIGN PATENT DOCUMENTS 1275874   5/1972   United Kingdom .................... 354/60 L Primary Examiner—L. T. Hix
Assistant Examiner—William B. Perkey
Attorney, Agent, or Firm—James C. Wray

[57] ABSTRACT

The exposure metering circuit comprises a differential amplifier, whose inputs are connected to a measuring bridge consisting of a photo-conductive cell and setting controls for the insertion of exposure factors and whose outputs are connected to light-emitting elements for the indication of a set under-exposure, over-exposure or the correct exposure. The two measuring bridge feed points are connected across a resistor, on the one hand, and across a transistor which is driven by means of a voltage derived from the common emitter circuit of the differential amplifier, on the other hand, to an operating voltage source.

7 Claims, 2 Drawing Figures

EXPOSURE MEASUREMENT CIRCUIT

BACKGROUND TO THE INVENTION

The invention relates to an exposure metering circuit wherein the indication to the effect whether the set exposure factor combination corresponds to an under-exposure, an over-exposure or to the correct exposure is effected by means of light-emitting elements.

PRIOR ART STATEMENT

On known units of this kind, the light-emitting elements are arranged downstream of a differential amplifier which is triggered from a bridge circuit, in which a photo-conductive cell exposed to the scene brightness as well as resistors for the insertion of exposure factors are connected together. (German Auslegeschrift Nos. 1,447,296; 1,906,201 and German Offenlegungsschrift No. 2,416,451 and U.S. Pat. No. 3,452,656 corresponding to German Auslegeschrift No. 1,447,296.)

The differential amplifier in-phase input signal varies in dependence on the prevailing light conditions and the bridge-balancing setting control setting which is thus provided when the bridge is balanced. By the in-phase input signal there is understood the unwanted voltage which arises with the same polarity and at the same level at both inputs of the differential amplifier and which is superimposed on the measuring bridge wanted signal. This in-phase input signal is furthermore dependent on the change in the operating voltage of the battery used as well as on temperatures which are outside the normal differential amplifier operating temperature; in the known units, it changes at extremely low and extremely high scene brightnesses practically between 0 Volt and the operating voltage level. The known units are therefore subject to a limited measurement range and to a reduced setting accuracy at the extreme points of the possible settings. To avoid this, differential amplifiers with a high in-phase rejection and a wide input voltage modulation range would be required. However, with the low and fluctuating operating voltages usual in exposure metering circuits, such amplifiers are very difficult to realise.

OBJECT OF THE INVENTION

The invention aims at improving the measuring accuracy and at widening the measuring range.

SUMMARY OF THE INVENTION

The task underlying the invention is the provision of an inexpensive exposure metering circuit of the kind characterised at the beginning which comprises a differential amplifier, which is controlled from a bridge circuit and which is uncritical with respect to the equality of the transistors, and whose balancing sharpness is independent of the scene brightness, the selected film sensitivity, the lens set as well as the operating voltage and the ambient temperature. The same independence is to apply to the currents emitted by the differential amplifier.

According to the invention, this task is solved in that the two feed points of the measuring bridge are connected to the operating voltage source across a resistor, on the one hand, and across a transistor which is driven by means of a voltage derived from the common emitter circuit of the differential amplifier, on the other hand. Preferably, a diode is conected between the measuring bridge feed points. An adjustable resistor lies in the common emitter circuit. The measuring bridge photo-conductive cell is preferably arranged outside the measuring bridge current paths, through which the transistor base currents flow.

BRIEF DESCRIPTION OF DRAWINGS

The invention will be explained hereinafter with reference to some exemplified embodiments. In the drawing.

DESCRIPTION OF PREFERRED EMBODIMENT

Figure 1:
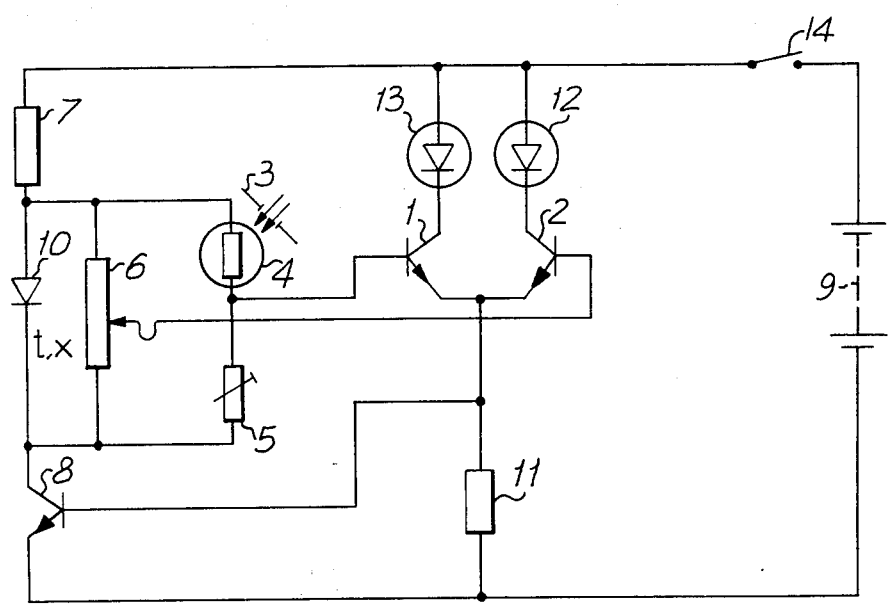
FIG. 1 shows a circuit for stabilising the light-emitting diode current of an exposure metering means.

As shown in FIG. 1, a measuring bridge, consisting of a photo-conductive cell 4 arranged behind a lens 3, a calibrating resistor 5 as well as a balancing potentiometer 6, is connected to the inputs of a differential amplifier formed by the transistors 1,2. The feed points of the measuring bridge are connected across a resistor 7, on the one hand, and across a transistor 8, on the other hand, to an operating voltage source 9. A voltage stabiliser, preferably a diode 10, is connected in parallel with the said feed points. A resistor 11 lies in the common emitter circuit of the transistors 1, 2; respectively one light-emitting diode 12, 13 lies in the common collector circuits. A switch is designated by 14.

Figure 2:
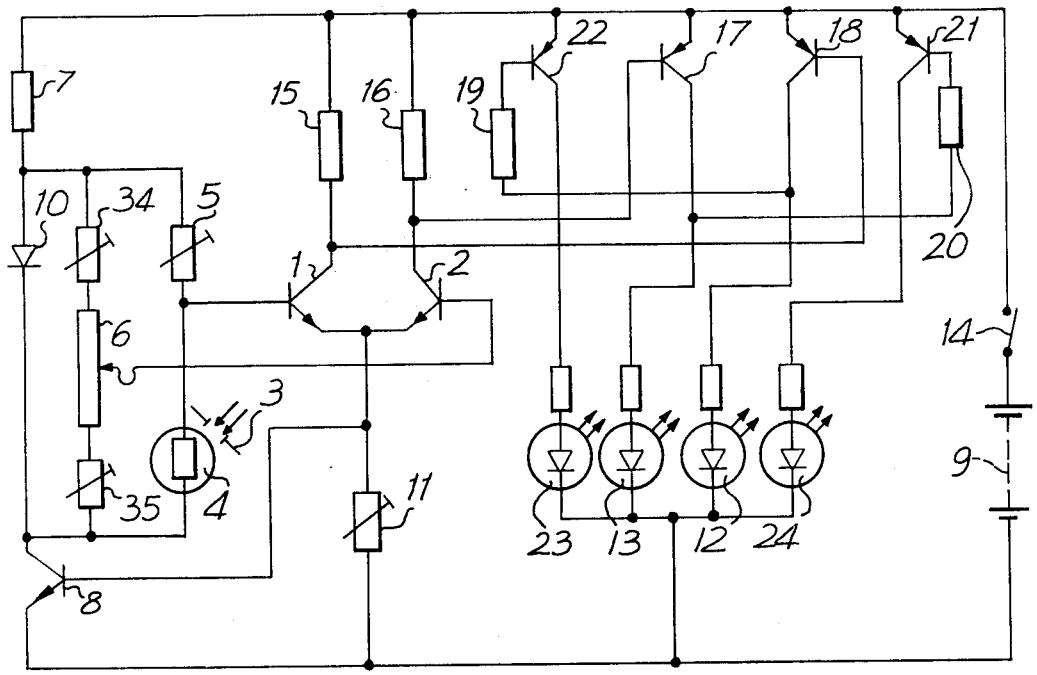
FIG. 2 shows the digital display including the input circuit according to the invention.

In the exemplified embodiment shown in FIG. 2, there are connected into the common collector circuits of the transistors 1, 2 the resistors 15, 16, from which the base voltages for the transistors 17, 18 are derived. The latter control the light-emitting diodes 13, 12 as well as, through the coupling impedances 19, 20, respectively one of the transistors 21, 22, in whose common collector circuits further light-emitting diodes 23, 24 are connected.

The mode of operation of FIG. 1 is as follows:

It is assumed that the measuring bridge is initially unbalanced. Therefore, that of the transistors 1, 2 will carry a current whose base potential is more positive, for example the transistor 1. This activates the light-emitting diode 13, whereby it is indicated that the exposure setting set would cause a faulty exposure. Already in this operational case, the effect of the compensating circuit according to the invention comes into play, in that it stabilises the light-emitting diode current to the value $$J_{LED} \approx U_{BE\,8}/R\;11.$$

As soon as, for example, the collector current from the transistor 1 starts to drop due to a dropping operating voltage, the voltage drop across the resistor 8 is also reduced, causing the transistor 8 to draw less current. As a result, the voltage drop across the resistor 7 is also reduced, so that the entire bridge circuit is increased in its potential and consequently also the base voltage of the transistor 1. The operating point of the differential amplifier transistors—in the case described, that of the transistor 1—thus continues to exist.

If the measuring bridge is balanced by the actuation of the potentiometer 6 or the lens 3, then the base voltages of both transistors approach each other, causing the current distribution across both of them to be changed. When the bridge is balanced, both transistors carry the same current and the lighting-up of both light-emitting diodes 12, 13 indicates the correct exposure setting. The sum of the currents flowing in both transistor outputs remains equal to the current which was previously given out by the transistor 1 alone.

As shown in FIG. 2, the resistors 15, 16 are connected into the common collector circuit of the transistors 1, 2 instead of the light-emitting diodes 12, 13. Due to the afore-described stabilisation of the current across the resistor 11, there is available across the resistors 15, 16 a voltage drop which is independent of the operating voltage and depends only on the balancing state of the measuring bridge. According to the relationship $$U_{15}/R_{15} + U_{16}/R_{16} = U_{BE\,8}/R_{11},$$

in this case, too, the sum of the collector currents is equal to the current across the resistor 11. Since the latter is adjustable, the total current can be adjusted in such a way that in the event of the bridge being balanced, the threshold voltages of the transistors 17, 18 are exceeded, so that the light-emitting diodes 12 and 13 light up and indicate the correct exposure setting. The transfer impedances 19, 20 cause the base currents from the transistors 21, 22 to be limited and the latter to be cut off in this phase. The light-emitting diodes 23, 24 are thus not activated. If a bridge unbalance is brought about, one of the two light-emitting diodes 12, 13 is extinguished, since one of the transistors 17, 18 is cut off. In this way, an under-exposure or over-exposure is indicated. In order to mark this faulty exposure particularly clearly, the cutting-off of one of the transistors 17, 18 is bound up with the driving of the respectively associated transistor 21 or 22, so that one of the light-emitting diodes 23, 24 lights up additionally. The temperature-dependent base-emitter voltages of the transistors 17, 18 are compensated for by the likewise temperature-dependent base-emitter voltage of the transistor 8.

The balancing sharpness, i.e. the setting member movement range within which a balance of the measurement ranges is effected, is largely independent of the scene brightness, preselectable exposure factors as well as the operating voltage.

Due to the arrangement of the photo-conductive cell 4 outside the current paths which carry the base currents from the transistors 1 and 2, the unbalancing influence exerted by this current, which influence is given in the circuit shown in FIG. 1 particularly when the photo-conductive cell 4 is highly resistive, is made impossible.

Instead of the diode 10 causing the stabilisation of the bridge voltage, there might be used, with the same effect, a transistor whose base and collector are interconnected.

The invention is not confined to the application in photographic cameras; it can also be used in hand exposure meters.

We claim:

1. An exposure metering circuit comprising:
a measuring bridge having first and second feed points connected to an operating voltage source and having first and second outputs for providing a signal indicative of the balancing state of the bridge, said bridge including a photoconductive cell and setting controls for the insertion of exposure factors;
a differential amplifier having two inputs connected to the respective outputs of said bridge and having outputs connected to light emitting elements for the indication of a set under exposure, over exposure or correct exposure condition;
and wherein the first feed point of said measuring bridge is connected to the operating voltage source via a resistor and the second feed point of said bridge is connected to the operating voltage source via the collector-emitter path of a transistor which transistor is driven at its base by means of a voltage derived from the common emitter circuit of the differential amplifier, to provide compensation for circuit fluctuations.

2. An exposure metering circuit according to claim 1 wherein stabilizer means are connected between the measuring bridge feed points to stabilize the bridge operating voltage.

3. An exposure metering circuit according to claim 2 wherein the stabilizer means comprises a diode.

4. An exposure metering circuit according to claim 1 wherein resistor means are connected into the common emitter circuit of the differential amplifier to provide additional control of said transistor.

5. An exposure metering circuit according to claim 4 wherein the resistor means comprises an adjustable resistor.

6. An exposure metering circuit according to claim 1 wherein the photoconductive cell is arranged outside the measuring dridge current paths, through which the differential amplifier base currents flow.

7. An exposure metering circuit according to claim 1 wherein the outputs of said differential amplifier are connected to said light emitting elements via transistor control means for selectively operating at least one of said light emitting elements in dependence on the set exposure condition.

* * * * *